(12) United States Patent
Chang et al.

(10) Patent No.: US 10,812,163 B2
(45) Date of Patent: Oct. 20, 2020

(54) CSI (CHANNEL STATE INFORMATION) ENHANCEMENTS FOR FD (FULL DIMENSION)-MIMO (MULTIPLE INPUT MULTIPLE OUTPUT)

(71) Applicant: Intel IP Corporation, Santa Clara, CA (US)

(72) Inventors: Wenting Chang, Beijing (CN); Yuan Zhu, Beijing (CN); Yushu Zhang, Beijing (CN); Huaning Niu, San Jose, CA (US); Gang Xiong, Portland, OR (US); Qinghua Li, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 16/081,172

(22) PCT Filed: Mar. 31, 2017

(86) PCT No.: PCT/US2017/025242
§ 371 (c)(1),
(2) Date: Aug. 30, 2018

(87) PCT Pub. No.: WO2017/173201
PCT Pub. Date: Oct. 5, 2017

(65) Prior Publication Data
US 2019/0068266 A1 Feb. 28, 2019

Related U.S. Application Data

(60) Provisional application No. 62/316,733, filed on Apr. 1, 2016.

(30) Foreign Application Priority Data

May 13, 2016 (WO) ................ PCT/CN2016/082020

(51) Int. Cl.
| | |
|---|---|
| H04B 7/06 | (2006.01) |
| H04L 5/00 | (2006.01) |
| H04W 72/04 | (2009.01) |
| H04B 7/0456 | (2017.01) |
| H04W 88/02 | (2009.01) |

(52) U.S. Cl.
CPC ......... H04B 7/0626 (2013.01); H04B 7/0456 (2013.01); H04B 7/0617 (2013.01);
(Continued)

(58) Field of Classification Search
CPC .. H04B 7/0626; H04B 7/0634; H04B 7/0617; H04B 7/0456; H04B 7/0639;
(Continued)

(56) References Cited

U.S. PATENT DOCUMENTS

2014/0044044 A1 2/2014 Josiam et al.
2015/0049824 A1 2/2015 Kim et al.
(Continued)

OTHER PUBLICATIONS

"Introduction to LTE-A Rel-13 FD-MIMO" Mar. 29, 2016, Industrial Technology Research Institute (Year: 2016).*
(Continued)

*Primary Examiner* — Curtis A Alia
(74) *Attorney, Agent, or Firm* — Eschweiler & Potashnik, LLC

(57) ABSTRACT

Techniques for improving CSI (Channel State Information) in connection with FD (Full Dimension)-MIMO (Multiple Input Multiple Output) are discussed. A first set of techniques can employ hierarchical cell common class B CSI-RS for improved beam selection. A second set of techniques can provide improved CSI feedback based on eigenvalue(s) and co-phase associated with a precoder. Various embodiments can employ either or both of the first set of techniques and/or the second set of techniques.

28 Claims, 11 Drawing Sheets

(52) U.S. Cl.
CPC ......... *H04B 7/0634* (2013.01); *H04B 7/0639* (2013.01); *H04L 5/0048* (2013.01); *H04W 72/046* (2013.01); *H04B 7/0469* (2013.01); *H04W 88/02* (2013.01)

(58) Field of Classification Search
CPC .. H04B 7/0469; H04L 5/0048; H04W 72/046; H04W 88/02
See application file for complete search history.

(56) References Cited

U.S. PATENT DOCUMENTS

| | | | |
|---|---|---|---|
| 2015/0333811 A1* | 11/2015 | Yu ........................ | H04B 7/0617 370/329 |
| 2016/0028519 A1 | 1/2016 | Wei | |
| 2016/0269084 A1* | 9/2016 | Nam ..................... | H04B 7/0417 |
| 2016/0359538 A1* | 12/2016 | Onggosanusi ....... | H04B 7/0469 |
| 2017/0134080 A1* | 5/2017 | Rahman ............... | H04B 7/0456 |

OTHER PUBLICATIONS

International Search Report dated Jul. 27, 2017 for International Application PCT/US2017/025242.
"On UE capability for FD-MIMO." Source: Intel Corporation. Agenda Item: 7.1.4. 3GPP TSG RAN WG1 Meeting #84, St. Julian's, Malta, Feb. 15-19, 2016. R1-160402. 4 pages.
International Preliminary Report on Patentability dated Oct. 11, 2018 for International Application PCT/US2017/025242.

* cited by examiner $$\mathbf{V} = \begin{bmatrix} a_{00} & a_{01} \\ a_{10} & a_{11} \\ a_{20} & a_{21} \\ a_{30} & a_{31} \end{bmatrix} \Rightarrow \mathbf{V}^{(1)} = \begin{bmatrix} 1 & 0 \\ 0 & a_{11}^{(1)} \\ 0 & a_{21}^{(1)} \\ 0 & a_{31}^{(1)} \end{bmatrix}$$

$$F_1 = I - 2\frac{w_1 w_1^H}{\|w_1\|^2}$$

FIG. 7

CSI (CHANNEL STATE INFORMATION) ENHANCEMENTS FOR FD (FULL DIMENSION)-MIMO (MULTIPLE INPUT MULTIPLE OUTPUT)

REFERENCE TO RELATED APPLICATIONS

This application is a National Phase entry application of International Patent Application No. PCT/US2017/025242 filed Mar. 31, 2017, which claims priority to U.S. Provisional Application 62/316,733 filed on Apr. 1, 2016, entitled ""CSI ENHANCEMENT FOR HIERARCHICAL FDMIMO" and International Application No. PCT/CN2016/082020 filed on May 13, 2016 entitled "IMPROVED CSI REPORT" in the name of Wenting Chang et al. and is hereby incorporated by reference in its entirety.

FIELD

The present disclosure relates to wireless technology, and more specifically to techniques for enhancing CSI (Channel State Information) for FD (Full Dimension) MIMO (Multiple Input Multiple Output), such as techniques related to hierarchical hybrid CSI for FD-MIMO and/or CSI reporting.

BACKGROUND

In 3GPP (Third Generation Partnership Project) Rel-13 (Release 13), two classes of FD (Full Dimension)-MIMO (Multiple Input Multiple Output) schemes were specified—Class A and Class B. The CSI (Channel State Information) feedback in Class A FD-MIMO is derived using the channel measurement from the non-precoded CSI-RS (CSI Reference Signal) and the configurable dual-codebook designed to support various 1D (one dimensional)/2D (two dimensional) antenna port layouts. The CSI feedback for Class B FD-MIMO is derived using the channel measurement from the beamformed CSI-RS. The conventional Rel-12 codebooks, supporting 1D antenna port layouts, or the newer Rel-13 beam selection codebooks can be used to calculate CSI feedback information.

BRIEF DESCRIPTION OF THE DRAWINGS

FIG. 7 is a diagram illustrating an example of a recursive Householder transformation that can be employed by a UE to quantize eigenvector(s), according to various aspects described herein.

DETAILED DESCRIPTION

Figure 1:
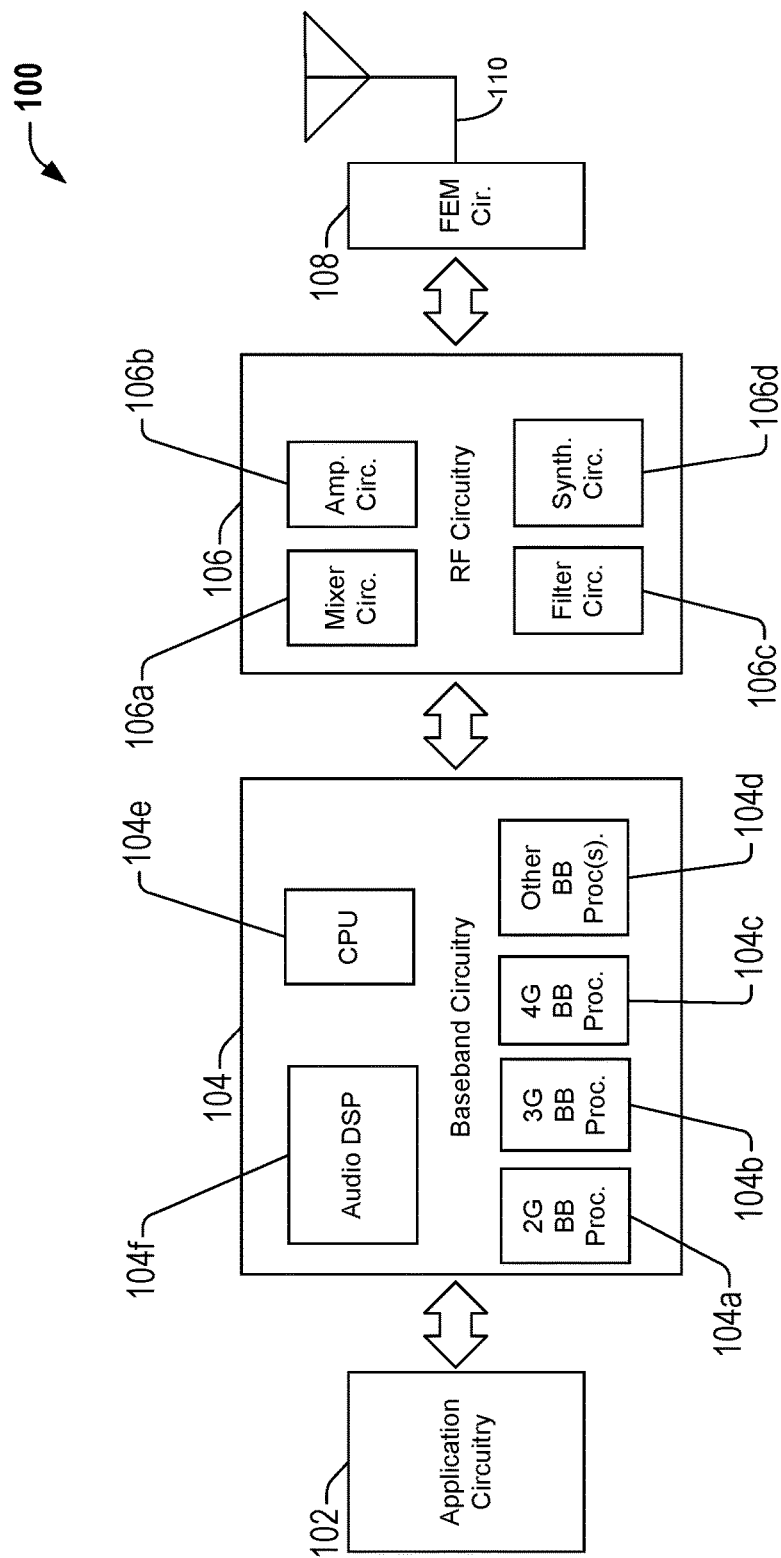
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB), etc.

Various aspects discussed herein relate to improvements in CSI-RS for FD-MIMO, such as a first set of techniques associated with a hierarchical hybrid Class B CSI-RS for FD-MIMO and/or a second set of techniques for improved CSI reporting based on eigenvector techniques discussed herein.

Figure 2:
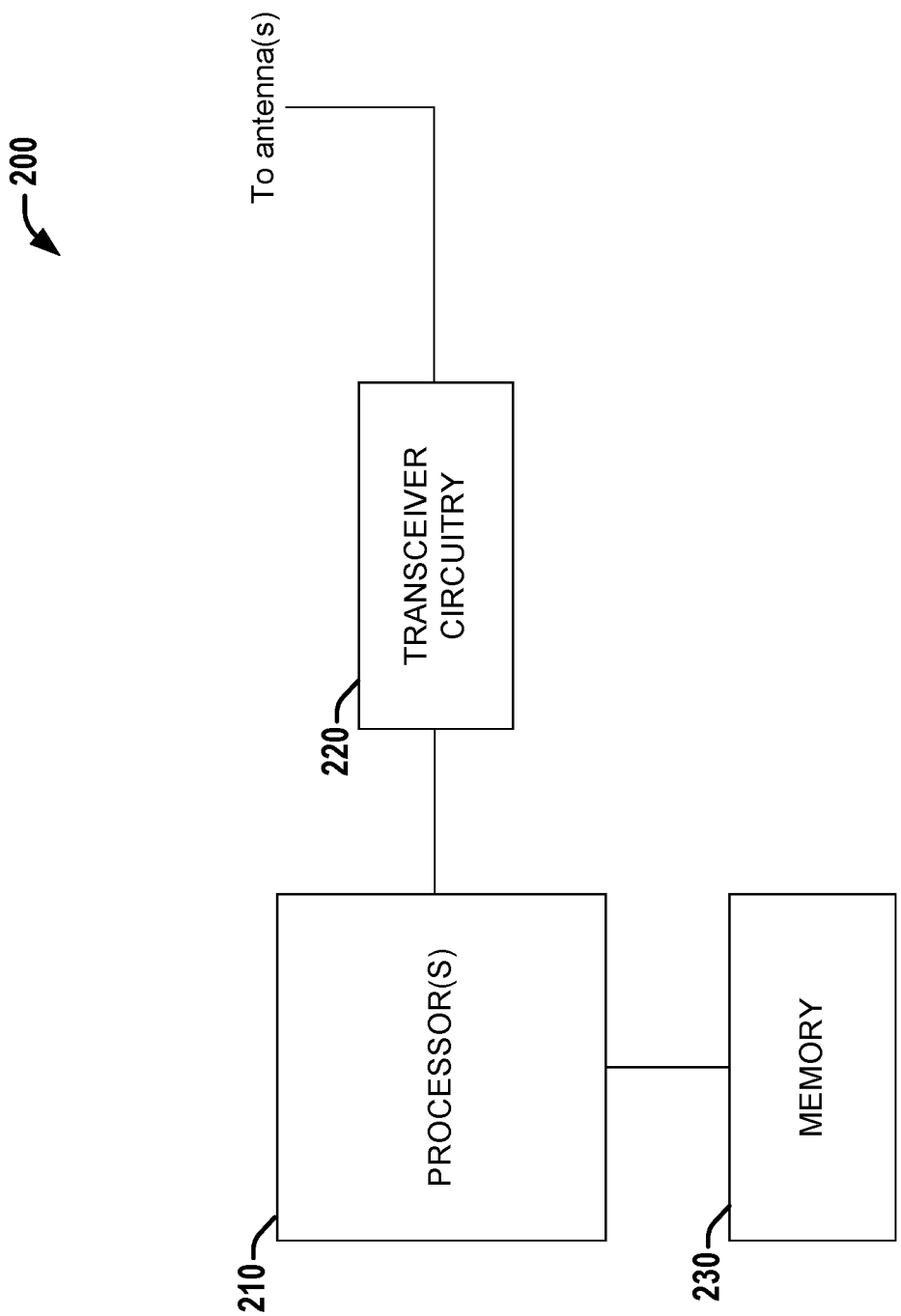
FIG. 2 is a block diagram illustrating an example system that facilitates improved techniques for CSI (Channel State Information) for FD (Full Dimension)-MIMO (Multiple Input Multiple Output) at a UE (User Equipment), according to various aspects described herein.

Referring to FIG. 2, illustrated is a block diagram of a system 200 that facilitates improved techniques for CSI for FD-MIMO at a UE, according to various aspects described herein. System 200 can include one or more processors 210 (e.g., one or more baseband processors such as one or more of the baseband processors discussed in connection with FIG. 1), transceiver circuitry 220 (e.g., comprising one or more of transmitter circuitry or receiver circuitry, which can employ common circuit elements, distinct circuit elements, or a combination thereof), and a memory 230 (which can comprise any of a variety of storage mediums and can store instructions and/or data associated with one or more of processor(s) 210 or transceiver circuitry 220). In various aspects, system 200 can be included within a user equipment (UE). As described in greater detail below, system 200 can implement one or more of a first set of techniques associated with providing CSI measurements/feedback in connection with a hierarchical Class B CSI-RS and/or a second set of techniques associated with calculation and feedback via CSI report(s) of eigenvalues and co-phase of a measured precoding matrix.

In connection with the first set of techniques, as described in greater detail herein, transceiver circuitry 220 can receive, and processor(s) 210 can process, cell common CSI-RS via a plurality (e.g., 4) of coarse beams. Based on the CSI-RS, processor(s) 210 can measure one or more CSI parameters (e.g., a PMI (precoding matrix indicator) and/or one or more other CSI parameters such as CQI (Channel Quality Indication), RI (Rank Indication), CRI (CSI-RS Resource Indicator)). Depending on the type of received signal or message, processing (e.g., by processor(s) 210, processor(s) 310, etc.) can comprise one or more of: identifying physical resources associated with the signal/message, detecting the signal/message, resource element group deinterleaving, demodulation, descrambling, and/or decoding. Based on the measured CSI parameter(s), processor(s) 210 can determine a best beam among the coarse beams, and can generate a CSI report (that can be transmitted by transceiver circuitry 220) indicating the best beam, which transceiver circuitry 220 can transmit to a serving BS (base station, e.g., eNB). An indicator of the best beam (e.g., its CSI-RS APs, a field that can map to CSI-RS APs, etc.) can be stored in memory 230. Depending on the type of signal or message generated, outputting for transmission (e.g., by processor(s) 210, processor(s) 310, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.).

Also in the first set of techniques, transceiver circuitry 220 can receive, and processor(s) 210 can process, CSI-RS via a plurality (e.g., 4) of finer beams for each of one or more levels of finer beams (wherein the beams of each level are finer/narrower than those of previous levels) for cell common CSI-RS, and processor(s) 210 can measure one or more CSI parameters for each of the one or more levels of finer beams. Each level of finer beams can be based on a best beam of a previous level (e.g., the coarse beams for a first level of finer beams, or a previous level of finer beams for any additional levels of finer beams), and can be narrower beams within (e.g., partially or wholly) or near the best beam of the previous level. Based on the measured CSI parameter(s), processor(s) 210 can determine a best beam among each level of finer beams, and can generate one or more CSI reports (that can be transmitted by transceiver circuitry 220) indicating the best beam(s), which transceiver circuitry 220 can transmit to a serving BS (base station, e.g., eNB). An indicator of the best beam (e.g., its CSI-RS APs, a field that can map to CSI-RS APs, etc.) can be stored in memory 230.

Continuing with the first set of techniques, transceiver circuitry 220 can receive, and processor(s) 210 can process, CSI-RS via a plurality (e.g., 4) of even finer beams (e.g., finer/narrower than those of cell common levels) for UE-specific CSI-RS, and processor(s) 210 can measure one or more CSI parameters for the beams for UE-specific CSI-RS. The beams for UE-specific CSI-RS can be based on a best beam of a final level of cell common CSI-RS beams, and can be narrower beams within (e.g., partially or wholly) or near the best beam of that level. Based on the measured CSI parameter(s), processor(s) 210 can determine a best beam among the U-specific CSI-RS beams, and can generate a CSI report (that can be transmitted by transceiver circuitry 220) indicating the best beam, which transceiver circuitry 220 can transmit to a serving BS (base station, e.g., eNB). An indicator of the best beam (e.g., its CSI-RS APs, a field that can map to CSI-RS APs, etc.) can be stored in memory 230.

In connection with a second set of techniques, transceiver circuitry 220 can receive, and processor(s) 210 can process, a set of CSI-RS associated with an FD-MIMO transmission from a plurality of antenna elements. Processor(s) 210 can determine one or more eigenvectors and a co-phasing associated with the transmission, for example, in aspects of the second set of techniques discussed in greater detail below (e.g., which can optionally be based on a Givens rotation and/or a Householder transformation, etc.). Processor(s) 210 can generate one or more CSI reports that indicate the eigenvector(s) (e.g., directly or based on angles, etc.) and the co-phase. Transceiver circuitry 220 can transmit the CSI report(s) to a serving BS (base station, e.g., eNB).

Additional details of UE embodiments implementing the first set of techniques and/or the second set of techniques are discussed in greater detail below.

Figure 3:
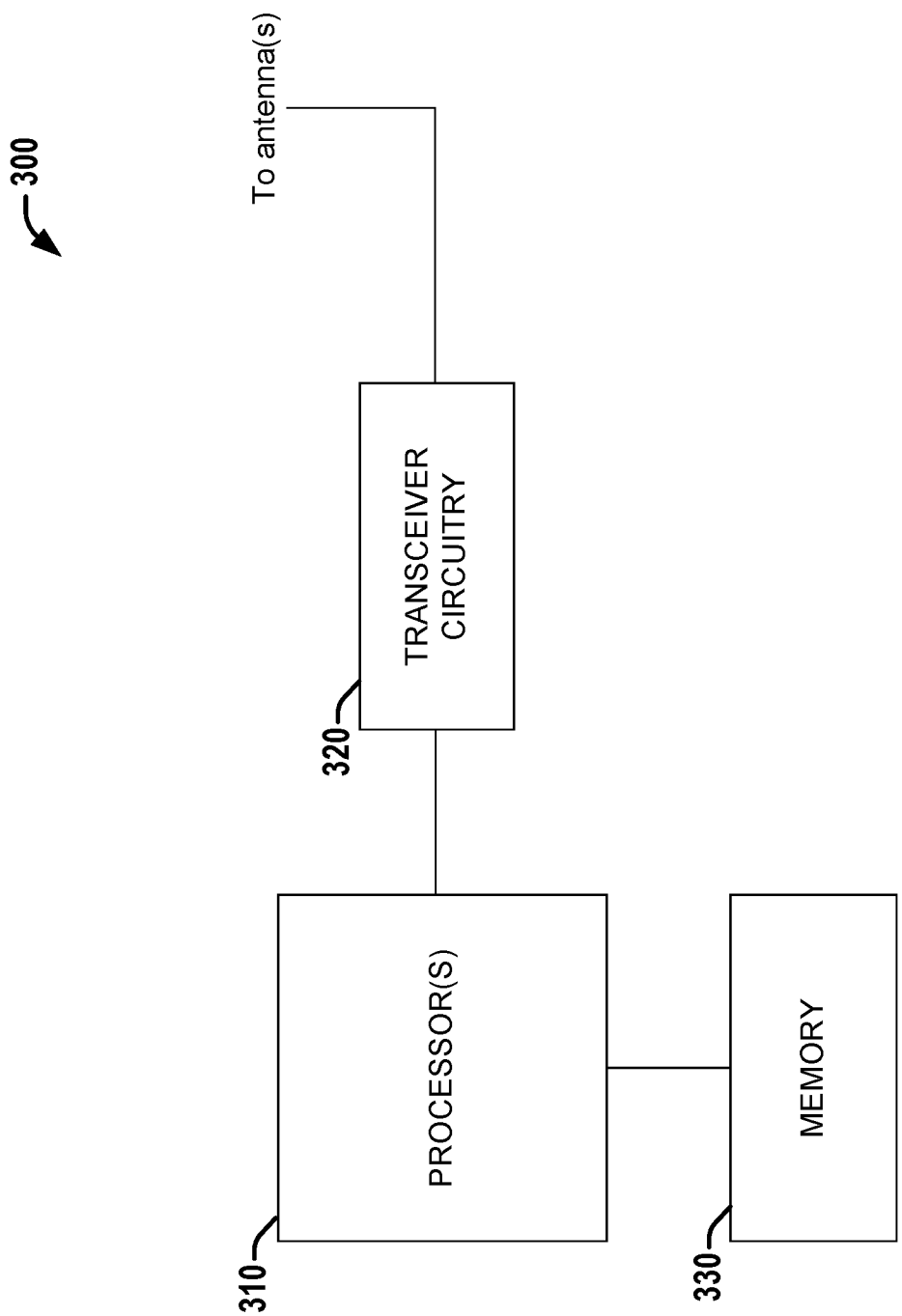
FIG. 3 is a block diagram illustrating an example system that facilitates enhanced CSI techniques for FD-MIMO at a BS (Base Station), according to various aspects described herein.

Referring to FIG. 3, illustrated is a block diagram of a system 300 employable at a base station that facilitates enhanced CSI techniques for FD-MIMO at the BS (Base Station), according to various aspects described herein. System 300 can include one or more processors 310 (e.g., one or more baseband processors such as one or more of the baseband processors discussed in connection with FIG. 1), transceiver circuitry 320 (e.g., which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 330 (which can comprise any of a variety of storage mediums and can store instructions and/or data associated with one or more of processor(s) 310 or transceiver circuitry 320). In various aspects, system 300 can be included within an Evolved Universal Terrestrial Radio Access Network (E-UTRAN) Node B (Evolved Node B, eNodeB, or eNB) or other base station in a wireless communications network. In some aspects, the processor(s) 310, transceiver circuitry 320, and the memory 330 can be included in a single device, while in other aspects, they can be included in different devices, such as part of a distributed architecture. As described in greater detail below, system 300 can facilitate techniques related to hierarchical Class B CSI-RS and/or CSI reporting with reduced overhead based on eigenvector and co-phase information.

In association with the first set of techniques, processor(s) 310 can generate, and transceiver circuitry 320 can transmit, cell common Class B CSI-RS via each of a plurality of (e.g., 4) coarse beams. Based on the coarse beams, transceiver circuitry 320 can receive, and processor(s) 310 can process, a CSI report from a UE that indicates a best beam (e.g., based on PMI and/or other CSI parameters).

Additionally, in the first set of techniques, processor(s) 310 can generate, and transceiver circuitry 320 can transmit CSI-RS for each of one or more additional levels for cell common Class B CSI-RS via each of a plurality of (e.g., 4) beams that are finer than beams of a previous level of cell common Class B CSI-RS (e.g., the coarse level for a first level of finer beams, or a previous level of finer beams), and can be based on a best beam indicated by the UE for the previous level. Based on each level of finer beams, transceiver circuitry 320 can receive, and processor(s) 310 can process, a CSI report from a UE that indicates a best beam for that level (e.g., based on PMI and/or other CSI parameters).

Also in the first set of techniques, processor(s) 310 can generate, and transceiver circuitry 320 can transmit CSI-RS for UE-specific Class B CSI-RS via each of a plurality of (e.g., 4) beams that are finer than beams of a previous level of cell common Class B CSI-RS (e.g., a final level of finer beams for cell common classB CSI-RS). Based on the beams for UE-specific CSI-RS, transceiver circuitry 320 can receive, and processor(s) 310 can process, a CSI report that indicates a best beam (e.g., based on PMI and/or other CSI parameters).

In connection with the second set of techniques, processor(s) 310 can generate a set of CSI for FD-MIMO that transceiver circuitry 320 can transmit via a plurality of antenna elements comprising a first set of antenna elements with a first polarization and a second set of antenna elements with a distinct second polarization (e.g., orthogonal to the first polarization).

Also in connection with the second set of techniques, transceiver circuitry 320 can receive, and processor(s) 310 can process, one or more CSI reports that indicate one or more eigenvalues of a precoder and a co-phase of the pre-coder. Based on the one or more CSI reports, processor(s) 310 can determine a reported PMI.

Additional details of BS embodiments implementing the first set of techniques and/or the second set of techniques are discussed in greater detail below.

Various aspects discussed herein related to a first set and a second set of techniques for enhancing CSI for FD-MIMO.

The first set of techniques discussed herein can be employed in connection with Class B CSI-RS. Compared to Class A, a CSI-RS transmission for FD-MIMO with a single CSI-RS resource (K=1) can be assisted by some additional information from the UE. More specifically, for Class B FD-MIMO, at most eight CSI-RS antenna ports can be configured, limiting the maximum number of beams that can be used for the beamformed CSI-RS transmission to four. To assist an eNB (Evolved Universal Terrestrial Radio Access Network (E-UTRAN) Node B, Evolved Node B, or eNodeB) in the selection of the candidate beams for CSI-RS transmission, legacy Rel-12 procedures can be used. For example, the RSRP (Reference Signal Received Power) measurements derived on the beamformed CSI-RS antenna ports can be exploited to identify the preferred beam set that should be used by the eNB for CSI-RS transmission. Such RSRP measurements on CSI-RS can be realized using the existing Rel-12 framework and can therefore be used for the comparison.

In the first set of techniques, existing FD-MIMO techniques can be enhanced by employing hierarchical Class B FD-MIMO techniques discussed herein. In various aspects, multiple CSI-RS resources can be defined (e.g., by processor(s) 310 via higher layer signaling sent via transceiver circuitry 320 to a UE employing system 200, which can receive via transceiver circuitry 220). Some of the CSI-RSs can be cell-specific CSI-RS (e.g., generated by processor(s) 310 and transmitted by transceiver circuitry 320), and groups of UEs (e.g., which can each implement a distinct system 200) can be enabled to measure based on those cell-specific CSI-RS (e.g., via measurements by processor(s) 210, after receiving the CSI-RS via transceiver circuitry 220, etc.). Additionally, some other CSI-RSs can be UE-specific CSI-RS (e.g., generated by processor(s) 310 and transmitted by transceiver circuitry 320), which can be, for example, linearly combined or beamwidth narrowed beams based on one of the levels of beams associated with cell-specific CSI-RS.

In the first set of techniques, the UE specific beamformed CSI-RS Class B scheme can be employed in conjunction with an additional cell-specific hierarchical Class B scheme discussed herein. In such a scenario, beamforming applied by a serving eNB (e.g., via weighting applied to a plurality of antenna elements by transceiver circuitry 320) to generate the UE specific beamformed CSI-RS can be derived based on CSI reporting from a cell specific hierarchical Class B scheme (e.g., CSI reports generated by processor(s) 210, transmitted by transceiver circuitry 220, received by transceiver circuitry 320, and processed by processor(s) 310). For example, cell specific hierarchical Class B and UE specific Class B FD-MIMO can be configured for different CSI processes in TM10 (Transmission Mode 10), such as by higher layer signaling generated by processor(s) 310, transmitted by transceiver circuitry 320, received by transceiver circuitry 220, and processed by processor(s) 210. The PMI (Precoding Matrix Indicator) report provided for a CSI process with a cell specific hierarchical Class B CSI process can be used to identify (e.g., by processor(s) 310) the candidate beams for the UE specific Class B CSI-RS transmission. In various aspects of the first set of techniques, a hierarchical Class B CSI-RS can be employed, which can employ both cell common hierarchical Class B CSI-RS and UE specific Class B CSI-RS.

In accordance with the first set of techniques, to assist an eNB in the selection of candidate beams for CSI-RS transmission, a hierarchical Class B CSI-RS can be employed by the eNB and UE, which can comprise both cell common hierarchical Class B CSI-RS and UE specific Class B CSI-RS. The first set of techniques can reduce search complexity and feedback overhead, and can provide better spatial resolution extensibilities than conventional techniques. Additionally, in aspects, in order to decrease the codebook searching complexity for Class A with a large number of APs (Antenna Ports), novel oversampling rates defined herein can be employed.

Figure 4:
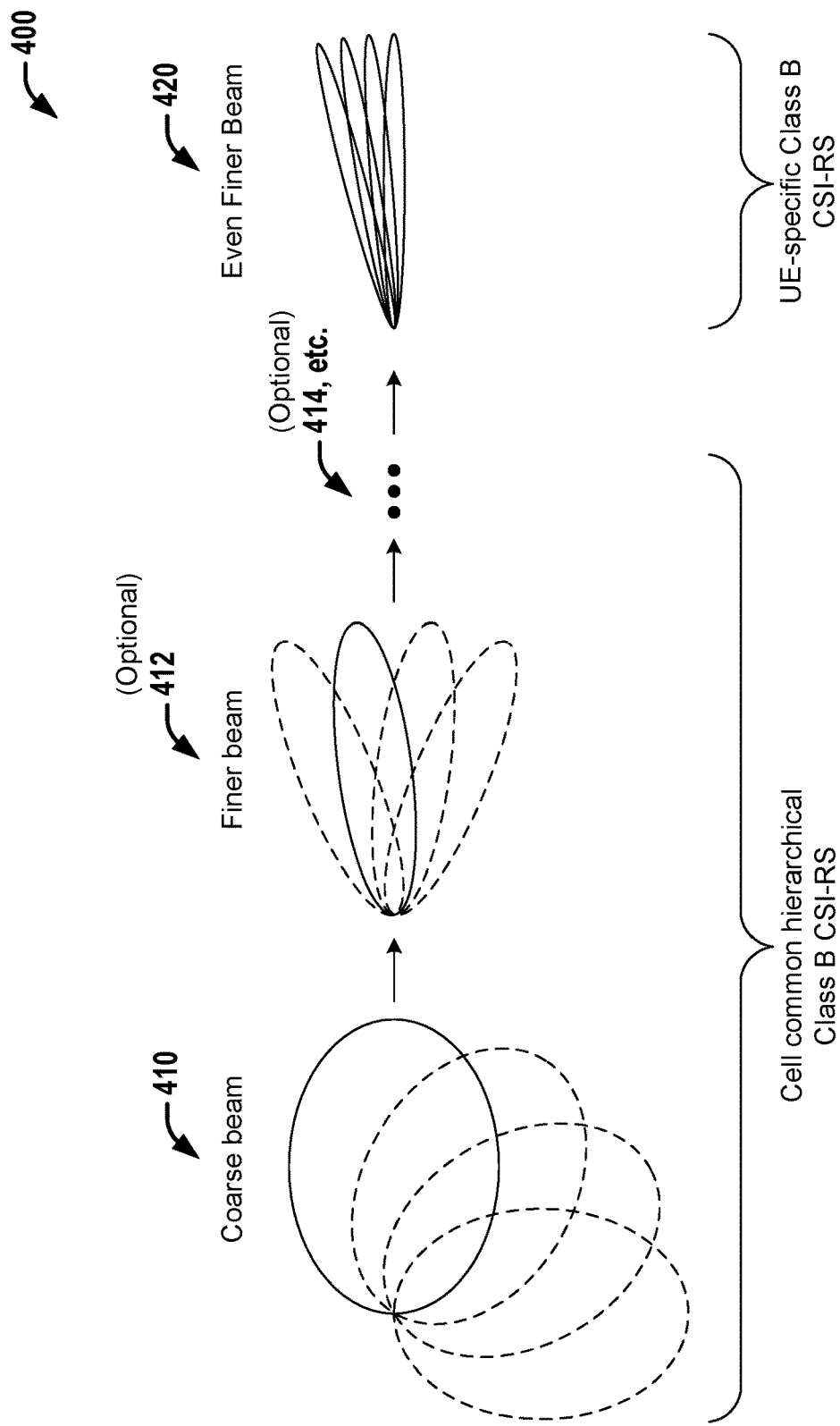
FIG. 4 is a diagram illustrating an example scenario of beam selection for hierarchical Class B FD-MIMO according to various aspects discussed herein.

Referring to FIG. 4, illustrated is a diagram of an example cell common hierarchical Class B CSI-RS that can be employed according to various aspects discussed herein. In aspects employing a cell common hierarchical Class B CSI-RS (e.g., the first set of techniques), a target cell coverage area can be split at 410 using $N_{C1}$ (e.g., four, etc.) coarse beams at a first tier (e.g., level $C_1$) of the cell common hierarchical Class B CSI-RS (e.g., wherein beams at each tier/level can be generated by processor(s) 310, transmitted by transceiver circuitry 320, received by transceiver circuitry 220, and measured by processor(s) 210). Those $N_{C1}$ (e.g., 4) coarse beams can be indicated using, for example, $2N_{C1}$ (e.g., 8) CSI-RS ports {15, 16, 17, 18, 19, 20, 21, 22}. A UE can first measure those $2N_{C1}$ (e.g., 8) CSI-RS ports to determine which the best (e.g., based on CSI measured by processor(s) 210 and reported via a CSI report generated by processor(s) 210 and transmitted by transceiver circuitry 220, etc.) coarse beam is, for example {15, 16}, which can be associated with the solid outline beam at 410. Then, optionally, each coarse beam can be further split at 412 into $N_{C2}$ (e.g., four, etc.) finer (e.g., narrower) beams at a second level (e.g., level $C_2$) of the cell common hierarchical Class B CSI-RS, and indicated using another $2N_{C2}$ (e.g., 8) CSI-RS ports {23, 24, 25, 26, 27, 28, 29, 30}. In the example of FIG. 4, the UE (e.g., via measurement by processor(s) 210) can find the second finer beam of level $C_2$ (indicated with the solid outline at 412) with CSI-RS ports {25, 26} to be the best (e.g., based on CSI measurements) finer beam for level $C_2$. Optionally, at 414, one or more additional levels (e.g., $C_3$, $C_4$, . . . ) of cell common hierarchical Class B CSI-RS can be included, with each level having $N_{C1}$ (e.g., 4) finer beams than the previous level, and the UE determining a best (e.g., based on measured CSI by processor(s) 210) beam for that level, which can be indicated as feedback to the eNB via one or more CSI reports (e.g., comprising a PMI and/or one other CSI parameters). The UE can send (e.g., via transceiver circuitry 220) one or more CSI reports (e.g., generated by processor(s) 210) to the eNB that can recommend the best measured beams for the first (level $C_1$), second (level $C_2$), and any additional levels. At 420, the eNB can create (e.g., by weighting determined by processor(s) 310 and applied to antenna elements by transceiver circuitry 320) a set of $N_{UE}$ (e.g., four) even finer beams (e.g., finer/narrower beams than the beams of the final level ($C_2$, etc.) of cell common hierarchical Class B CSI-RS) for UE-specific Class B CSI-RS, based on which the UE can measure (e.g., via processor(s) 210) and feedback CSI (e.g., via transceiver circuitry 220 transmitting a CSI report generated by processor(s) 210).

In aspects employing the first set of techniques, an eNB can indicate to UEs when CSI-RS associated with different cell common levels (e.g., $C_1$, $C_2$, etc.) will be transmitted, e.g., based on higher layer signal (e.g., generated by processor(s) 310 and transmitted by transceiver circuitry 320 based on transmission times determined by processor(s) 310). Based on CSI feedback from a UE (e.g., generated by processor(s) 210 and transmitted by transceiver circuitry 220) in connection with cell common hierarchical Class B CSI-RS, the eNB (e.g., via processor(s) 310 generating configuration transmitted by transceiver circuitry 320) can configure UE-specific CSI-RS for that UE, based on which the UE can provide CSI feedback (e.g., generated by processor(s) 210 and transmitted by transceiver circuitry 220) for the UE-specific CSI-RS.

In various embodiments employing the first set of techniques, the depth of the hierarchical Class B CSI-RS can be configured by higher layer (e.g., RRC (Radio Resource Control), MAC (Medium Access Control), etc.) signaling (e.g., generated by processor(s) 310 and transmitted by transceiver circuitry 320), or can be pre-defined. For example, a single bit can be employed, which can indicate either one level of finer beams (level $C_2$) or two levels (levels $C_2$ and $C_3$). For example, a "0" can indicate one level of finer beams (level $C_2$), and a "1" can indicate two levels of finer beams (levels $C_2$ and $C_3$), or vice versa (in aspects wherein more than two levels of finer beams can be employed, more than one bit can be used to indicate the number of levels).

Additionally, in various embodiments employing the first set of techniques, the level of a CSI-RS (e.g., level $C_1$ vs. $C_2$, etc.) can be configured via higher layer signaling (e.g., generated by processor(s) 310 and transmitted by transceiver circuitry 320) or can be pre-defined (e.g., in a specification). In aspects with two levels, a single bit can be used to indicate the level the CSI-RS is associated with (e.g., "0" for level $C_1$, "1" for level $C_2$). In aspects with more than two levels, more than one bit can be employed to indicate the associated level.

In various embodiments employing the first set of techniques, a one to one mapping relationship between beams of one level (e.g., $C_1$) and sets of beams of a next level (e.g., $C_2$) can be configured by higher layer signaling (e.g., generated by processor(s) 310 and transmitted by transceiver circuitry 320), or can be pre-defined (e.g., in a specification). As an example, a beam in level $C_i$ with CSI-RS port {y1, y2} can be related to a set of finer beams in level $C_{i+i}$ with finer beam of CSI-RS ports {{z1, z2}, {z3, z4}, {z5, z6}, {z7, z8}}.

In various embodiments employing the first set of techniques, the CSI of each level of the hierarchical Class B CSI-RS can be fed back (e.g., via a CSI report generated by processor(s) 210 and transmitted by transceiver circuitry 220) either by Class B with K=1 or Class B with K>1.

In various embodiments employing the first set of techniques, a UE (e.g., processor(s) 210) can omit determination of the RI (Rank Indication) and/or CQI (Channel Quality Indicator) for cell common CSI-RS resources, and can determine only rank one PMI (Precoding Matrix Indicator) for the hierarchical Class B CSI-RS.

In various embodiments employing the first set of techniques, for each level of the hierarchical Class B CSI-RS, the PMI index can be reported from the UE to the eNB for K=1, and the CRI (CSI-RS Resource Indicator) index can be reported from the UE to the eNB for K>1 (e.g., via CSI report(s) generated by processor(s) 210, transmitted by transceiver circuitry 220, received by transceiver circuitry 320, and processed by processor(s) 310).

In various embodiments employing the first set of techniques, a depth indicator can be configured by higher layer signaling (e.g., generated by processor(s) 310 and transmitted by transceiver circuitry 320). In one example, a two bit indicator can be employed, wherein "00" can indicate one level of finer beams, "01" can indicate two levels of finer beams, "10" can indicate three levels of finer beams, "11" can indicate four levels of finer beams. A UE providing CSI feedback (e.g., generated by processor(s) 210 and transmitted by transceiver circuitry 220) can associate a depth indicator with the CSI feedback to indicate the specific level associated with that CSI feedback.

Alternatively, in aspects employing the first set of techniques, an alternative to hierarchical Class B based beam information feedback can be employed wherein Class A CSI-RS can be used (e.g., by processor(s) 210) to feedback the beam information for the UE specific Class B CSI-RS. However, for Class A FD-MIMO, if the port number increases up to 32, the complexity at the UE can be greatly increased for codebook searching due to both a larger codebook size and channel dimension.

In various embodiments employing the first set of techniques, in order to reduce the complexity of class A with a large number of APs (Antenna Ports), a smaller oversampling rate than conventional oversampling rates can be defined and employed (e.g., by processor(s) 210) in scenarios wherein Class A CSI-RS is used in a hybrid mode to feedback beam information for UE specific Class B CSI-RS information. For example, an oversampling rate of 1 or 2 can be employed, as illustrated in Table 1, below:

TABLE 1

Example of Oversampling Factor for Class A for Large AP scenario while used for hybrid operation to train UE specific Class B beams

| Number of CSI-RS antenna ports, P | $(N_1, N_2)$ | $(O_1, O_2)$ |
|---|---|---|
| 32 | (4, 4) | (1, 1), (2, 2) |
|  | (8, 2) | (1, 1), (1, 2), (2, 2) |
|  | (16, 1) | (1, —), (2, —) |

Additionally, a second set of techniques discussed herein can facilitate CSI reporting with reduced overhead based on eigenvector techniques discussed herein.

In RAN (Radio Access Network) #71 (meeting 71), a new WI (Work Item) was set to improve the performance of FD-MIMO, and one of the targets included was:

"As second priority, evaluate and, if needed, specify enhancement on CSI reporting based on non-precoded and beamformed CSI-RS to improve eNB precoding (such as new feedback methodologies in addition to codebook-based CSI feedback) and interference measurement to support efficient multi-user transmissions (e.g. further enabling interference estimation from NZP or ZP CSI-RS)

Analog feedback is not precluded"

When the number of antennas is increased, for example, from 16 to 32, the accuracy of CSI can impact the system performance, especially for multiple user scenarios. It can impact whether radio energy is converged toward a targeting UE, and whether mutual interference among multiplexed UEs is suppressed.

Figure 5:
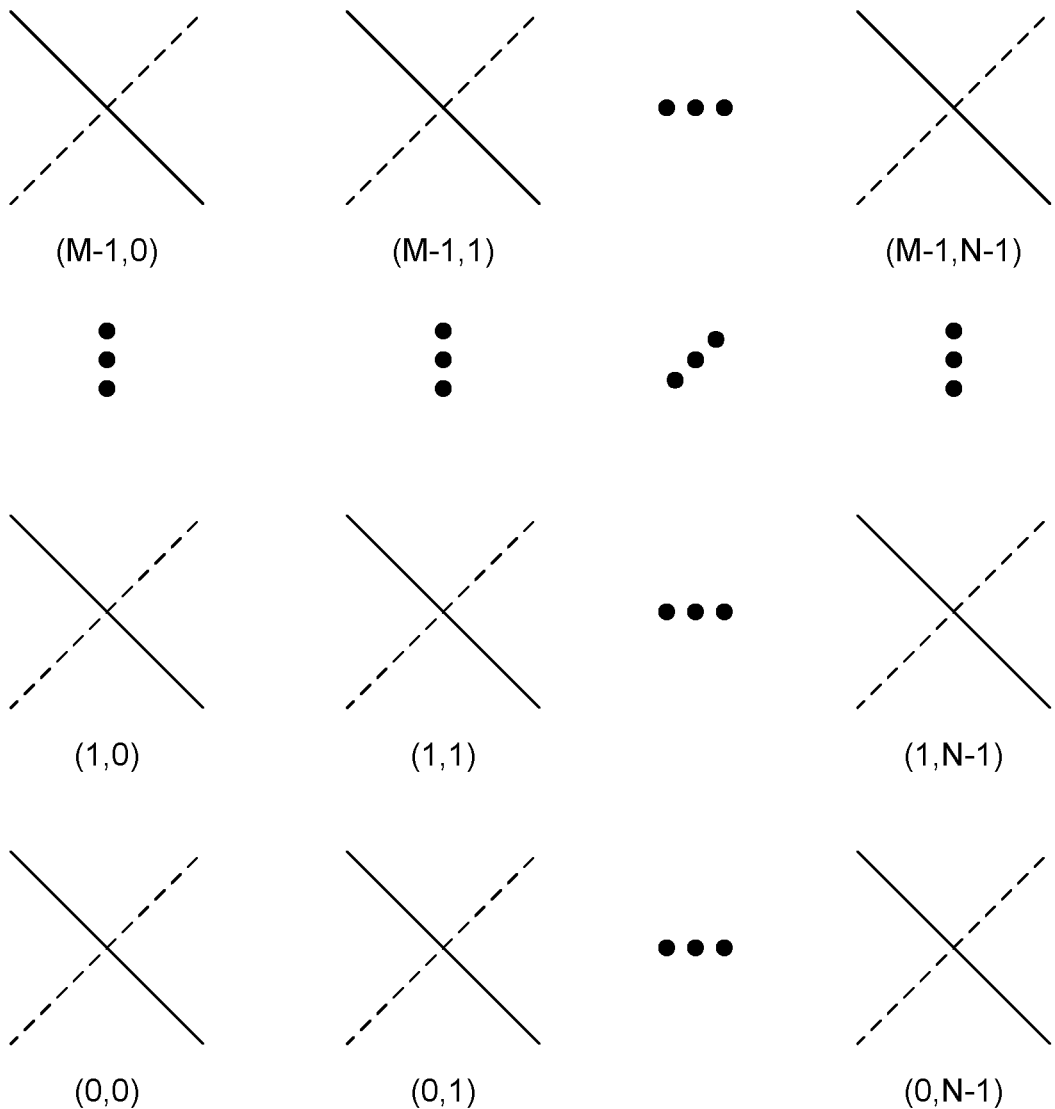
FIG. 5 is a diagram illustrating an example antenna model that can be employed in connection with various aspects discussed herein.

Referring to FIG. 5, illustrated is a diagram of an example antenna model that can be employed (e.g., by transceiver circuitry 320) in connection with various aspects discussed herein. Antenna elements can be deployed with evenly distributed horizontal and vertical distance, and every two antenna elements with different polarization can be co-located at the same position (e.g., as indicated by the co-located solid and dashed lines at various positions in FIG. 3). In aspects discussed herein, the antenna elements can be divided into two groups based on polarization, wherein antenna elements with the same polarization belong to the same group. The channel matrix of one group can be approximately described by multiplying a co-phase on the channel matrix of the other group. Because of this characteristic, various embodiments can employ CSI reporting according to a second set of techniques discussed herein, wherein eigenvector(s) and co-phase can be reported, which can achieve a better tradeoff between performance and report overhead than conventional techniques.

In various aspects employing the second set of techniques, better performance, especially in a multiple user scenario, can be heavily dependent on accurate CSI reporting. However, increased accuracy in CSI reporting leads to increased overhead of CSI reports. In various aspects employing the second set of techniques discussed herein, a superior tradeoff between accuracy and overhead can be achieved by employing the second set of techniques, wherein the eigenvector(s) and co-phase can be reported. In various aspects, a Givens rotation or a Householder transformation can be employed (e.g., by processor(s) 210), which can further reduce the overhead of CSI reports, as can techniques related to even/uneven quantization.

An FD-MIMO system can be described by equation (1):

$$y = HWx + n \quad (1)$$

where y is a $N_r \times 1$ receiving vector, H is a $N_r \times N_t$ channel matrix, W is a $N_t \times N_p$ precoding matrix, x is a $N_p \times 1$ signal vector, n is a $N_r \times 1$ noise vector, $N_r$ is the number of receiving antennas, $N_t$ is the number of transmitting antennas, and $N_p$ is the number of layers.

The precoding matrix W can be divided into two submatrices, $W_1$ and $W_2$, as indicated in equation (2):

$$y = HWx + n = HW_1 W_2 x + n = \tilde{H} W_2 x + n \quad (2)$$

where $W_1$ is the $N_t \times N_d$ wideband precoding matrix. For class A FD-MIMO, it can be indicated by a pair PMI $(i_{1,1}, i_{1,2})$, and for class B FD-MIMO, it can depend on the eNB implementation. Conventionally, $W_2$ is indicated by the PMI $i_2$. $\hat{H}$ is the effective channel matrix.

In order to improve the accuracy of $W_2$ for better system performance, in various embodiments employing the second set of techniques, the eigenvector(s) of the reduced channel matrix (which contains $N_t/2$ antenna elements with the same polarization) and the co-phase can be reported (e.g., in a CSI report generated by processor(s) 210, transmitted by transceiver circuitry 220, received by transceiver circuitry 320, and processed by processor(s) 310) as $W_2$, as in equation (3):

$$W_2 = \frac{1}{\sqrt{2rN_d}} \begin{bmatrix} v'_1 & v'_1 & v'_2 & v'_2 & \dots \\ \varphi_1 v'_1 & -\varphi_1 v'_1 & \varphi_2 v'_2 & -\varphi_2 v'_2 & \dots \end{bmatrix}_{N_d \times r} \quad (3)$$

where $v'_i$ ($0 \leq i \leq [r/2]$) are eigenvectors of the reduced channel matrix H', and satisfy $$v'_i H v'_j = \begin{cases} N_d, & \text{if } i = j \\ 0, & \text{otherwise} \end{cases}.$$

Another alternative $W_2$ structure that can be employed (e.g., by system 200 in the same manner as the $W_2$ of equation (3) and the associated eigenvector(s) and co-phase) in various embodiments can be written as in equation (4):

$$W_2 = \frac{1}{\sqrt{2rN_d}} \begin{bmatrix} v'_1 & v'_2 & v'_1 & v'_2 & \dots \\ \varphi_1 v'_1 & -\varphi_2 v'_2 & -\varphi_1 v'_1 & \varphi_2 v'_2 & \dots \end{bmatrix}_{N_d \times r} \quad (4)$$

The rank 2 precoder can be transmitted from different beams.

In some embodiments employing the second set of techniques, the frequency granularity of the eigenvector(s) can be different from that of the co-phase (in other embodiments, they can be the same). For example, the eigenvector(s) can be measured and reported (e.g., in a CSI report generated by processor(s) 210 and transceiver circuitry 220) for a subband size $N_1$ RBs (Resource Blocks) and the co-phase $\varphi_n$ can be measured and reported (e.g., by processor(s) 210 and transceiver circuitry 220) for a subband size $N_2$ (with $N_2 \neq N_1$) RBs. In some such aspects, $N_1$ can be a multiple of $N_2$. Additionally, in some such embodiments, the subband sets $N_1$ and $N_2$ can be configured through higher layer signalling (e.g., generated by processor(s) 310 and transmitted by transceiver circuitry 320).

Additionally, in various embodiments of the second set of techniques, the reporting periods of the eigenvector(s) and co-phasing can be different (in other embodiments, they can have a common reporting period). For example, the eigenvectors can be reported (e.g., in a CSI report generated by processor(s) 210 and transceiver circuitry 220) every $T_1$ subframes and the co-phasing can be reported (e.g., in a CSI report generated by processor(s) 210 and transceiver circuitry 220) every $T_2$ subframes (in aspects with a common reporting period, the eigenvectors and co-phasing can both be reported every $T_1$ subframes, and can be reported in the same or different subframes). In some such embodiments, the reporting periods $T_1$ and $T_2$ can be configured through higher layer signalling (e.g., generated by processor(s) 310 and transceiver circuitry 320).

In some embodiments of the second set of techniques, the eigenvector(s) can be reported (e.g., in a CSI report generated by processor(s) 210 and transceiver circuitry 220) in an analog manner, wherein the amplitude and the phase can both be reported.

In various embodiments of the second set of techniques, the eigenvector(s) can quantified (e.g., by processor(s) 210) based on a Givens rotation, and can be reported as a set of quantified angles (e.g., in a CSI report generated by processor(s) 210 and transceiver circuitry 220). For example, if $N_d=8$, the eigenvectors of one polarization can be denoted as in equation (5):

$$V = [v_1' \ v_2'] = \begin{bmatrix} a_{0,0} & a_{0,1} \\ a_{1,0} & a_{1,1} \\ a_{2,0} & a_{2,1} \\ a_{3,0} & a_{3,1} \end{bmatrix} \quad (5)$$

where $\alpha_{i,j} = \alpha_{i,j} e^{j\mu_{i,j}}$, with subscript indices $0 \leq i \leq 3$, $0 \leq j \leq 1$ (the non-subscript j (e.g., the one immediately preceding $\mu_{i,j}$) is the imaginary unit), and satisfies $$\sum_{i=0}^{3} |a_{i,0}|^2 = 1.$$

As far as the number of eigenvectors, for the $W_2$ structure in equation (3) (or equation (4)), there is only one eigenvector for rank 1/2 and two eigenvectors for rank 3/4.

An example implementation of a Givens rotation in connection with the second set of techniques is discussed below. In such examples, the amplitude and angle of V can be represented by multiple angles, as described below.

Figure 6:
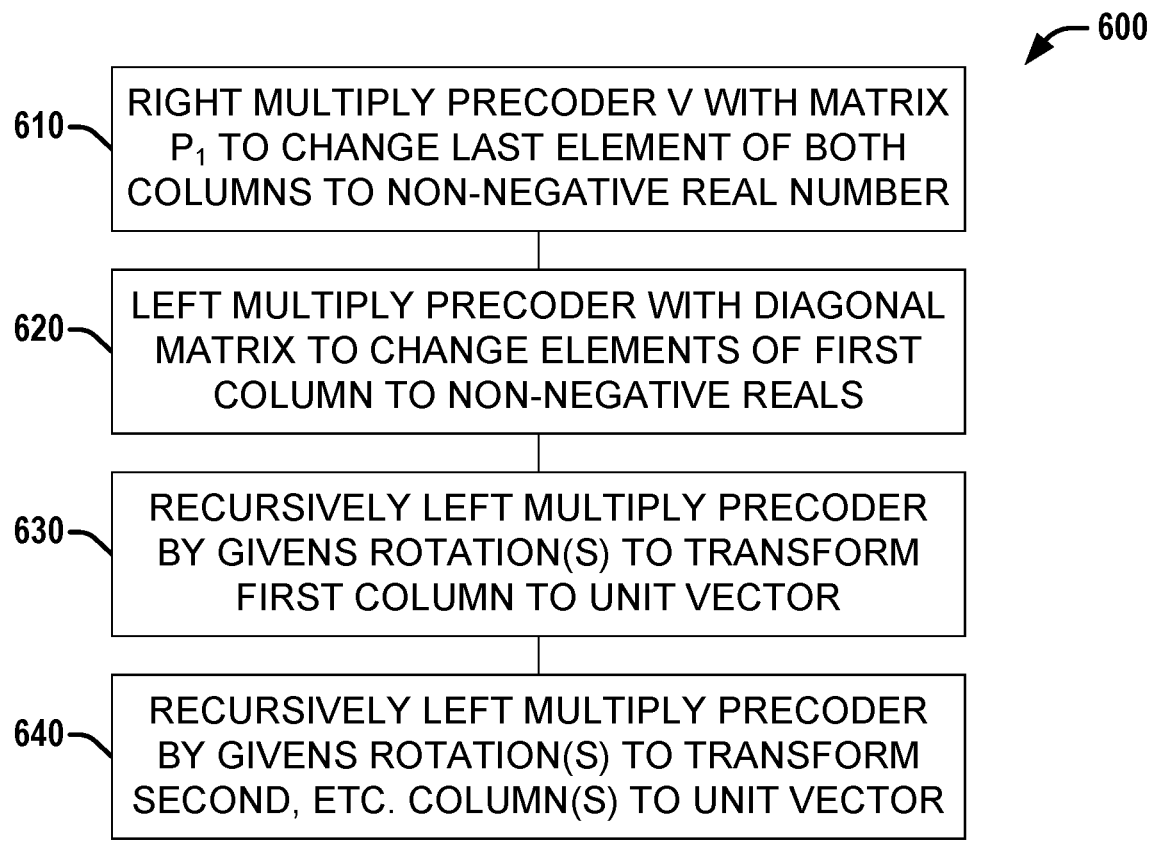
FIG. 6 is a flow diagram illustrating a method that facilitates decomposition of eigenvectors of a precoding matrix into angles via Givens rotations, according to various aspects described herein.

Referring to FIG. 6, illustrated is a flow diagram of a method 600 that facilitates decomposition of eigenvectors of a precoding matrix into angles via Givens rotations, according to various aspects described herein. In some aspects, method 600 can be performed at a UE. In other aspects, a machine readable medium can store instructions associated with method 600 that, when executed, can cause a UE to perform the acts of method 600.

At 610, in a first act associated with techniques employing a Givens rotation (e.g., which can be implemented by processor(s) 210), a precoder V can be right multiplied with matrix $P_1$ as in equation (6), where $$P_1 = \begin{bmatrix} e^{-j\mu_{3,0}} & 0 \\ 0 & e^{-j\mu_{3,1}} \end{bmatrix},$$

which can change the last element of both columns to a non-negative real number:

$$V^{(1)} = VP_1 \quad (6)$$

At 620, in a second act associated with techniques employing a Givens rotation (e.g., which can be implemented by processor(s) 210), precoder $V^{(1)}$ can be left multiplied with $P_2$, which can be a diagonal matrix to change the elements of the first column from complex number(s) to non-negative real number(s), as shown in equation (7):

$$V^{(2)} = P_2 V^{(1)} \quad (7)$$

where $P_2 = \text{diag}([e^{j\delta_{0,0}} \ e^{j\delta_{1,0}} \ e^{j\delta_{2,0}} \ 1])$, and $\delta_{i,0} = \mu_{3,0} - \mu_{i,0}$.

At 630, in a third act associated with techniques employing a Givens rotation (e.g., which can be implemented by processor(s) 210), the precoder can be recursively left multiplied by a Givens rotation to transform the first column into a unit vector. For the kth (k=1 ... 3) Givens rotation matrix, four elements with row/column locations of (0,0), (0, k), (k,0), and (k, k) are equal to $\cos(\phi_k)$, $\sin(\phi_k)$, $-\sin(\phi_k)$, and $\cos(\phi_k)$, respectively, where $\cos(\phi_k) = \alpha'_{0,0} / \sqrt{\alpha'^2_{0,0} + \alpha'^2_{k,0}}$, and $\alpha'$ can be updated iteratively. Then the eigenvector(s) can be equivalent to equation (8):

$$V^{(3)} = P_3 V^{(2)} = \begin{bmatrix} 1 & 0 \\ 0 & b_{1,1} \\ 0 & b_{2,1} \\ 0 & b_{3,1} \end{bmatrix} \quad (8)$$

At 640, in a fourth act associated with techniques employing a Givens rotation (which can be implemented by processor(s) 210), similarly to the third act, the second column of $V^{(3)}$ can be transformed into a unit vector as $V^{(4)}$ through recursive Givens rotation decomposition as in equation (9):

$$V^{(4)} = P_4 V^{(3)} = \begin{bmatrix} 1 & 0 \\ 0 & 1 \\ 0 & 0 \\ 0 & 0 \end{bmatrix} \quad (9)$$

Through 610-640, the eigenvectors can be decomposed into $$\sum_{i=N_d/2}^{N_d/2-r+1} 2(i-1)$$

angles in matrices $P_2$, $P_3$, and $P_4$, for example, 10 in the example. Then the UE (e.g., via processor(s) 210) can quantize these angles, and report back (e.g., in a CSI report generated by processor(s) 210 and transceiver circuitry 220)

the rotation angles applied for the transmitter side to reconstruct (e.g., via processor(s) 310) the eigenbeams in equation (4).

In another example, acts 610 and 620 can be reused to transform the eigenvector into a non-negative vector, and the first column can be quantized (e.g., by processor(s) 210) with non-negative entries in a different way than described in connection with acts 610-640 above. For example, one column can be recursively divided into hierarchical subgroups, and the ratio between the two subgroups can be defined as in equations (10):

$$a_{2,0} = \begin{bmatrix} \alpha_{0,0} \\ \alpha_{1,0} \end{bmatrix}, b_{2,0} = \begin{bmatrix} \alpha_{2,0} \\ \alpha_{3,0} \end{bmatrix}, \text{ and } \gamma_{2,0} = \frac{f(a_{2,0}) - f(b_{2,0})}{f(a_{2,0}) + f(b_{2,0})} \quad (10)$$

$$a_{1,0} = \alpha_{0,0}, b_{1,0} = \alpha_{1,0}, \text{ and } \gamma_{1,0} = \frac{f(a_{1,0}) - f(b_{1,0})}{f(a_{1,0}) + f(b_{1,0})}$$

$$a_{1,1} = \alpha_{2,0}, b_{1,1} = \alpha_{3,0}, \text{ and } \gamma_{1,1} = \frac{f(a_{1,1}) - f(b_{1,1})}{f(a_{1,0}) + f(b_{1,1})};$$

where, for example, $f(x)=|x|^2$, or $f(x)=|x|$, or $f(x)=|x_0|+|x_1|+\ldots+|x_N|$ (e.g., the sum of the entries). Then the UE can quantize (e.g., via processor(s) 210) $rN_d/2$ angles, which can be utilized (e.g., by processor(s) 210) to transform the eigenvector(s) into non-negative vector(s), and the amplitude ratio(s) as shown in equation (10) can be reported to an eNB (e.g., via a CSI report generated by processor(s) 210, transmitted by transceiver circuitry 220, received by transceiver circuitry 230, and processed by processor(s) 210).

In various embodiments employing the second set of techniques, a Householder transformation can be utilized (e.g., by processor(s) 210) to quantize the eigenvector(s). Referring to FIG. 7, illustrated is an example of a recursive Householder transformation that can be employed by a UE (e.g., via processor(s) 210) to quantize eigenvector(s), according to various aspects described herein. First, $\alpha_{00}$ can be set to a real value by multiplying the first column of V by $e^{-j\phi_1}$, where $\phi_1$ is the phase of $\alpha_{11}$. Then a Householder transformation can be performed (e.g., via processor(s) 210) to obtain $V^{(1)}$, with a second column containing three non-zero elements. In this case, the UE can quantize (e.g., via processor(s) 210) the three complex elements $e^{-j\phi/j\phi_1}\alpha_{10}$, $e^{-j\phi_1}\alpha_{20}$, $e^{-j\phi_1}\alpha_{30}$ in the first column and two complex elements $e^{-j\phi_2}\alpha_{21}^{(1)}$, $e^{-j\phi_2}\alpha_{31}^{(1)}$ in the second column, where $\phi_1$, $\phi_2$ are the phases of $a_{00}$ and $a_{11}^{(1)}$, respectively. At the eNB, the reverse procedure can be performed (e.g., by processor(s) 310) to reconstruct the eigenvector(s).

In various embodiments employing the second set of techniques, an even quantization can be utilized (e.g., by processor(s) 210, etc.). For example a random variable $\rho$ can range from 0 to 1, then it can be split into $2^{N_A}$ regions, as in example equation (11):

$$\hat{\rho} = (\lfloor \rho/(1/2^{N_A}) \rfloor + 0.5)\frac{1}{2^{N_A}} \quad (11)$$

Additionally, in various embodiments employing the second set of techniques, an uneven quantization can be utilized (e.g., by processor(s) 210, etc.) according to the statistics of a random variable. For example, the probably of a random variable p being within a limited range, for example, from 0 to 0.3 (or other ranges) can be leveraged to save overhead, as in the example in equation (12):

$$\hat{\rho}_m = \begin{cases} \left(\left\lfloor \rho_m / \left(\frac{0.3}{2^{N_A}-1}\right) \right\rfloor + 0.5\right)\frac{0.3}{(2^{N_A}-1)} & \text{if } \rho_m \in [0, 0.3) \\ 0.9 & \text{otherwise} \end{cases} \quad (12)$$

Adopting a Givens rotation, the total quantized bit number is equal to $$\sum_{i=N_d/2}^{N_d/2-r+1} 2(i-1)N_A$$

for even quantization, and equal to $$\sum_{i=N_d/2}^{N_d/2-r+1} \sum_{j=1}^{2(i-1)} N_{A,j}$$

for uneven quantization. For example, if even quantization is utilized with 4 bits, the total quantized bit number is equal to 40.

In various aspects of the second set of techniques, the co-phase candidates can utilize the set $\{1, j, -1, -j\}$. In other aspects, an extended set can be adopted, for example, $$\left\{ e^{-j2\pi\frac{0}{8}}, e^{-j2\pi\frac{1}{8}}, e^{-j2\pi\frac{2}{8}}, \ldots, e^{-j2\pi\frac{7}{8}} \right\}.$$

Figure 8:
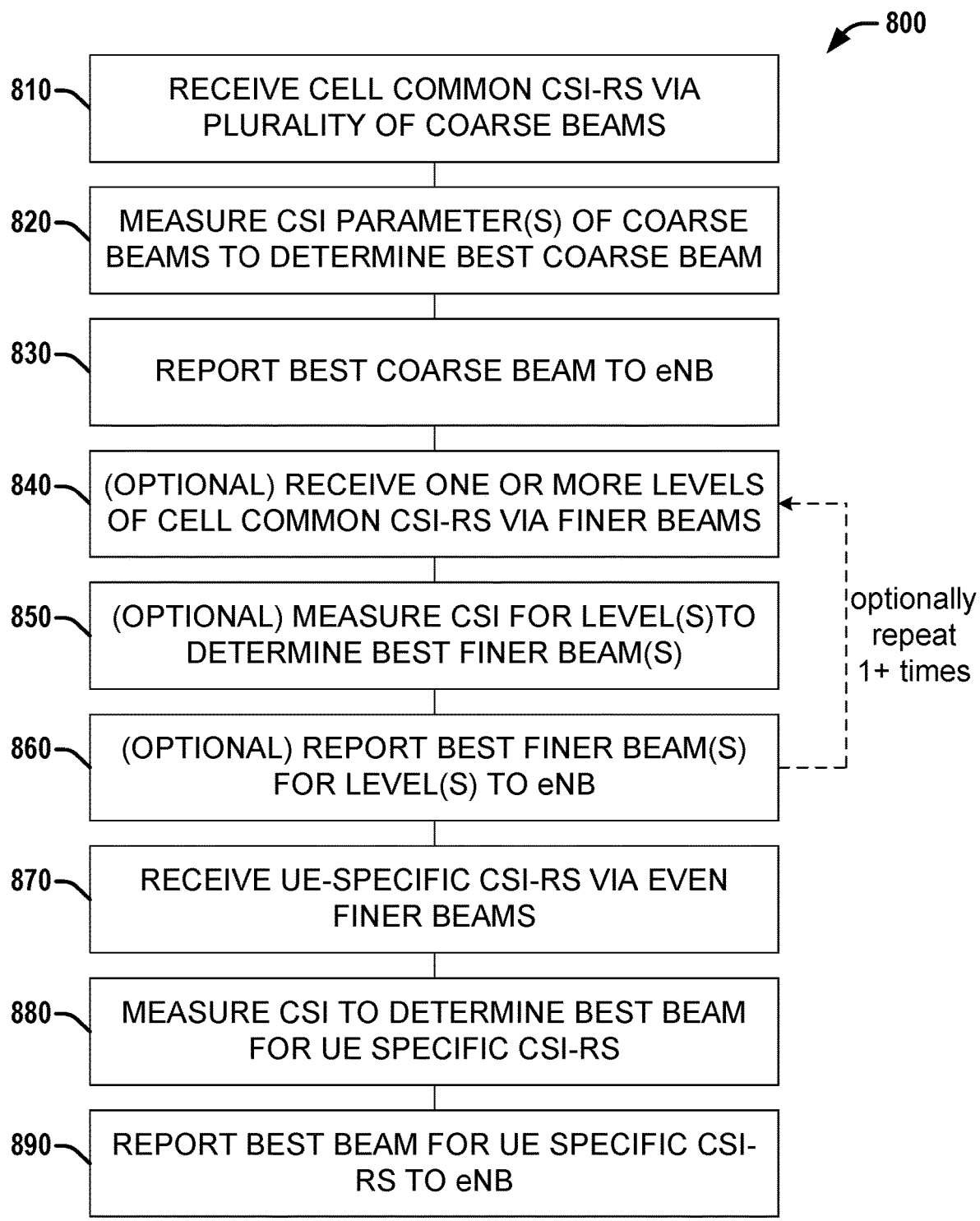
FIG. 8 is a flow diagram illustrating a method that facilitates beam selection via hierarchical Class B CSI-RS at a UE, according to various aspects described herein, according to various aspects described herein.

Referring to FIG. 8, illustrated is a flow diagram of a method 800 that facilitates beam selection via hierarchical Class B CSI-RS at a UE, according to various aspects described herein. In some aspects, method 800 can be performed at a UE. In other aspects, a machine readable medium can store instructions associated with method 800 that, when executed, can cause a UE to perform the acts of method 800.

At 810, cell common CSI-RS can be received via a plurality of coarse beams.

At 820, one or more CSI parameters (e.g., PMI, CRI, etc.) can be measured for each of the coarse beams to determine a best beam.

At 830, the best coarse beam can be indicated to a serving base station via a CSI report.

At 840, optionally, cell common CSI-RS can be received via a plurality of beams of a next finer level of beams.

At 850, optionally, one or more CSI parameters (e.g., PMI, CRI, etc.) can be measured for each of the beams received for the next finer level of cell common CSI-RS.

At 860, optionally, the best beam of the next finer level of cell common CSI-RS can be indicated to a serving base station via a CSI report. Optionally, acts 840-860 can be repeated one or more times, each time with narrower/finer beams than the previous level, depending on the number of levels of hierarchical cell common class B CSI-RS.

At 870, UE-specific CSI-RS can be received via a plurality of beams narrower than the final level of cell common CSI-RS beams.

At 880, one or more CSI parameters (e.g., PMI, CRI, etc.) can be measured for each of the beams for UE-specific CSI-RS to determine a best beam.

At 890, the best beam for UE-specific CSI-RS can be indicated to a serving base station via a CSI report.

Additionally or alternatively, method 800 can include one or more other acts described above in connection with system 200 and/or UE implementation of the first set of techniques.

Figure 9:
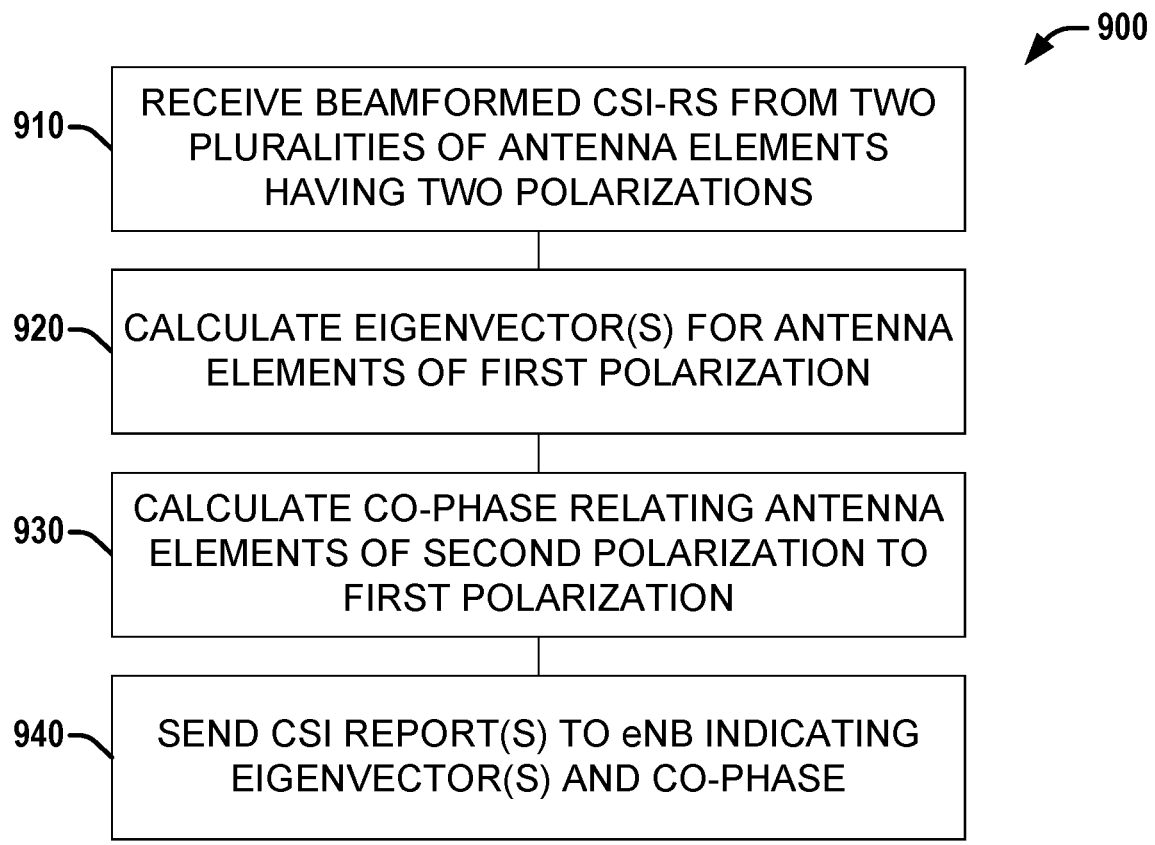
FIG. 9 is a flow diagram illustrating a method that facilitates CSI reporting based on eigenvalue techniques at a UE, according to various aspects described herein.

Referring to FIG. 9, illustrated is a flow diagram of a method 900 that facilitates CSI reporting based on eigenvalue techniques at a UE, according to various aspects described herein. In some aspects, method 900 can be performed at a UE. In other aspects, a machine readable medium can store instructions associated with method 900 that, when executed, can cause a UE to perform the acts of method 900.

At 910, a set of CSI-RS can be received via a beamformed transmission from an antenna array of antenna elements comprising a first plurality of antenna elements with a first polarization and a second plurality of antenna elements with a second polarization that is distinct from the first polarization.

At 920, a set of eigenvectors (e.g., one or more, depending on the scenario) can be computed for the first plurality of antenna elements.

At 930, a co-phase can be determined that relates the second plurality of antenna elements to the first plurality of antenna elements.

At 940, one or more CSI reports can be sent to an eNB indicating the eigenvector(s) and co-phase.

Additionally or alternatively, method 900 can include one or more other acts described above in connection with system 200 and/or UE implementation of the second set of techniques.

Figure 10:
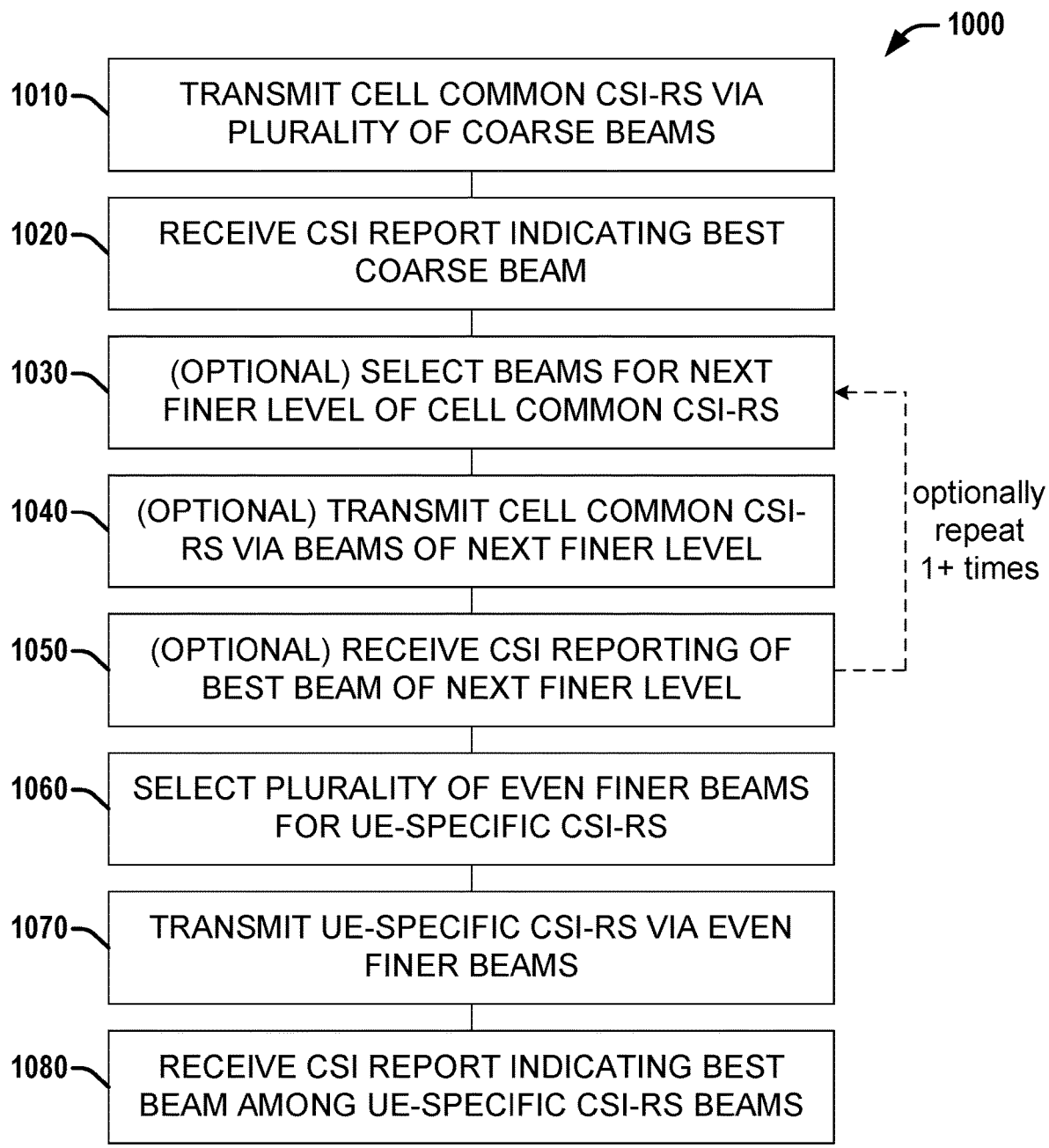
FIG. 10 is a flow diagram illustrating a method that facilitates beam selection at a BS via a hierarchical class B CSI-RS, according to various aspects described herein.

Referring to FIG. 10, illustrated is a flow diagram of a method 1000 that facilitates beam selection at a BS via a hierarchical class B CSI-RS, according to various aspects described herein. In some aspects, method 1000 can be performed at an eNB. In other aspects, a machine readable medium can store instructions associated with method 1000 that, when executed, can cause an eNB to perform the acts of method 1000.

At 1010, cell common CSI-RS can be transmitted via a plurality of coarse beams.

At 1020, a CSI report can be received indicating a best beam among the coarse beams.

At 1030, optionally, a plurality of next finer beams for a next level of beams for cell common CSI-RS can be selected based at least in part on the indicated best beam of a previous level of cell-common CSI-RS (e.g., coarse beams, or a previous level of finer beams).

At 1040, optionally, cell common CSI-RS can be transmitted via a plurality of beams of the next finer level of beams.

At 1050, optionally, a CSI report can be received indicating a best beam among the next finer beams. Optionally, acts 1030-1050 can be repeated one or more times, each time with narrower/finer beams than the previous level, depending on the number of levels of hierarchical cell common class B CSI-RS.

At 1060, a plurality of even finer beams for UE-specific CSI-RS can be selected based at least in part on the indicated best beam of a final level of cell-common CSI-RS.

At 1070, UE-specific CSI-RS can be transmitted via a plurality of beams narrower than the final level of cell common CSI-RS beams.

At 1080, a CSI report can be received indicating a best beam among the beams for UE-specific CSI-RS.

Additionally or alternatively, method 1000 can include one or more other acts described above in connection with system 300 and/or BS (e.g., eNB) implementation of the first set of techniques.

Figure 11:
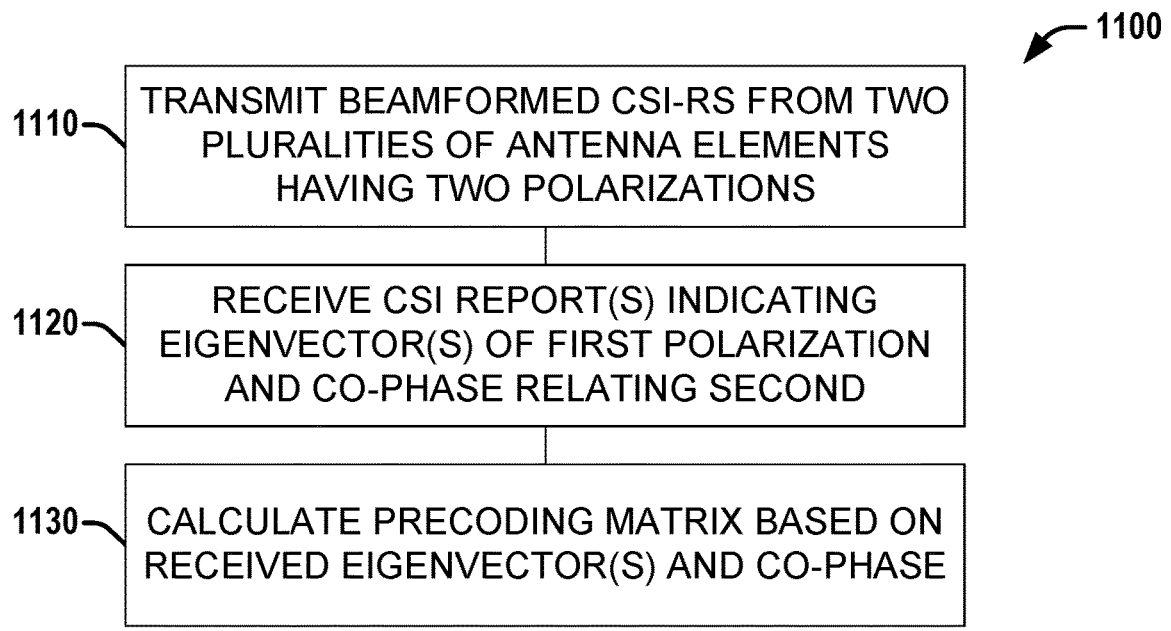
FIG. 11 is a flow diagram illustrating a method that facilitates CSI reporting based on eigenvalue techniques at a BS, according to various aspects described herein.

Referring to FIG. 11, illustrated is a flow diagram of a method 1100 that facilitates CSI reporting based on eigenvalue techniques at a BS, according to various aspects described herein. In some aspects, method 1100 can be performed at an eNB. In other aspects, a machine readable medium can store instructions associated with method 1100 that, when executed, can cause an eNB to perform the acts of method 1100.

At 1110, beamformed CSI-RS can be transmitted from an antenna array comprising a first plurality of antenna elements having a first polarization and a second plurality of antenna elements having a distinct second polarization.

At 1120, one or more CSI reports can be received indicating one or more eigenvectors associated with the first plurality of antenna elements, and indicating a co-phase relating the second plurality of antenna elements to the first plurality of antenna elements.

At 1130, a precoding matrix can be calculated based on the eigenvector(s) and co-phase.

Additionally or alternatively, method 1100 can include one or more other acts described above in connection with system 300 and/or BS (e.g., eNB) implementation of the second set of techniques.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a User Equipment (UE), comprising: a memory; and one or more processors configured to: for each level of one or more levels: for each of one or more beams for that level, measure one or more CSI parameters for that beam based on cell common CSI (Channel State Information)-RS (Reference Symbols) of that beam; determine a best beam for that level based on the measured one or more CSI parameters of the one or more beams for that level; and generate at least one CSI report for that level indicating the best beam for that level; for each of one or more UE-specific beams, measure one or more CSI parameters for that UE-specific beam based on UE-specific CSI-RS of that UE-specific beam; determine a best UE-specific beam of the one or more UE-specific beams based on the measured one or more CSI parameters of the one or more UE-specific beams; and generate at least one UE-specific CSI report indicating the best UE-specific beam, wherein the memory is configured to store an associated cell common indicator for the best beam for each level of the one or more levels and to store an associated UE-specific indicator for the best UE-specific beam.

Example 2 comprises the subject matter of any variation of any of example(s) 1, wherein the one or more processors are further configured to process higher layer signaling that indicates a depth, N, wherein the one or more levels comprises N levels.

Example 3 comprises the subject matter of any variation of any of example(s) 1, wherein the one or more processors are further configured to process higher layer signaling that indicates a level index associated with CSI-RS resources for each level of the one or more levels.

Example 4 comprises the subject matter of any variation of any of example(s) 1, wherein the one or more processors are further configured to determine a level index associated with CSI-RS resources for each level of the one or more levels based on a predefined value.

Example 5 comprises the subject matter of any variation of any of example(s) 1, wherein the one or more levels comprises two or more levels, and for each level other than a final level of the one or more levels, a pair of CSI-RS APs (Antenna Ports) for each beam of that level is associated with a distinct set of pairs of CSI-RS APs for a plurality of beams of a next level of the one or more levels, and wherein the one or more processors are configured to either: process higher layer signaling that indicates the association between the pair of CSI-RS APs for each beam and the distinct set of pairs of CSI-RS APs for the plurality of beams of the next level; or determine, based on predefined values, the association between the pair of CSI-RS APs for each beam and the distinct set of pairs of CSI-RS APs for the plurality of beams of the next level.

Example 6 comprises the subject matter of any variation of any of example(s) 1-5, wherein, for each level of the one or more levels, the at least one CSI report comprises a class B report with K=1 or a class B report with K>1.

Example 7 comprises the subject matter of any variation of any of example(s) 6, wherein the CSI report comprises a PMI (Precoding Matrix Indicator) index when the CSI report comprises the class B report with K=1, and wherein the CSI report comprises a CRI (CSI-RS Resource Indicator) index when the CSI report comprises the class B report with K>1.

Example 8 comprises the subject matter of any variation of any of example(s) 1-5, wherein, for each level of the one or more levels, the measured one or more CSI parameters is a PMI (Precoding Matrix Indicator).

Example 9 comprises the subject matter of any variation of any of example(s) 1-5, wherein, for each level of the one or more levels, the at least one CSI report comprises a Class A report.

Example 10 comprises the subject matter of any variation of any of example(s) 8, wherein the Class A report is based at least in part on an oversampling rate of 1 or 2.

Example 11 comprises the subject matter of any variation of any of example(s) 1-5, wherein, for each level of the one or more levels, the at least one CSI report comprises a depth indicator that indicates that level.

Example 12 comprises the subject matter of any variation of any of example(s) 1-5, wherein, for each level of the one or more levels, the at least one CSI report indicates one or more eigenvectors associated with a first polarization for the best beam for that level and a co-phase between the first polarization and a second polarization for the best beam for that level.

Example 13 comprises the subject matter of any variation of any of example(s) 1-2, wherein the one or more processors are further configured to process higher layer signaling that indicates a level index associated with CSI-RS resources for each level of the one or more levels.

Example 14 comprises the subject matter of any variation of any of example(s) 1-2 or 13, wherein the one or more processors are further configured to determine a level index associated with CSI-RS resources for each level of the one or more levels based on a predefined value.

Example 15 comprises the subject matter of any variation of any of example(s) 1-2 or 13-14, wherein the one or more levels comprises two or more levels, and for each level other than a final level of the one or more levels, a pair of CSI-RS APs (Antenna Ports) for each beam of that level is associated with a distinct set of pairs of CSI-RS APs for a plurality of beams of a next level of the one or more levels, and wherein the one or more processors are configured to either: process higher layer signaling that indicates the association between the pair of CSI-RS APs for each beam and the distinct set of pairs of CSI-RS APs for the plurality of beams of the next level; or determine, based on predefined values, the association between the pair of CSI-RS APs for each beam and the distinct set of pairs of CSI-RS APs for the plurality of beams of the next level.

Example 16 comprises the subject matter of any variation of any of example(s) 1-7, wherein, for each level of the one or more levels, the measured one or more CSI parameters is a PMI (Precoding Matrix Indicator).

Example 17 is an apparatus configured to be employed within an Evolved NodeB (eNB), comprising: a memory; and one or more processors configured to: determine a set of beams for a first level of one or more cell common levels; for each level of the one or more cell common levels: for each of one or more beams for that level, generate a set of cell common CSI (Channel State Information)-RS (Reference Symbols) for that beam; receive at least one CSI report for that level indicating a best beam for that level; and determine a set of beams for a next level, wherein the next level is a UE (User Equipment)-specific level or a next level of the one or more cell common levels; for each of one or more UE-specific beams of the UE-specific level, generate a set of UE-specific CSI-RS of that UE-specific beam; and receive at least one UE-specific CSI report indicating a best UE-specific beam, wherein the memory is configured to store an associated cell common indicator for the best beam for each level of the one or more levels and to store an associated UE-specific indicator for the best UE-specific beam.

Example 18 comprises the subject matter of any variation of any of example(s) 17, wherein the one or more processors are further configured to generate higher layer signaling that indicates a depth, N, wherein the one or more levels comprises N levels.

Example 19 comprises the subject matter of any variation of any of example(s) 17, wherein the one or more processors are further configured to generate higher layer signaling that indicates a level index associated with CSI-RS resources for each level of the one or more levels.

Example 20 comprises the subject matter of any variation of any of example(s) 17, wherein the one or more levels comprises two or more levels, and for each level other than a final level of the one or more levels, a pair of CSI-RS APs (Antenna Ports) for each beam of that level is associated with a distinct set of pairs of CSI-RS APs for a plurality of beams of a next level of the one or more levels, and wherein the one or more processors are configured to generate higher layer signaling that indicates the association between the pair of CSI-RS APs for each beam and the distinct set of pairs of CSI-RS APs for the plurality of beams of the next level.

Example 21 comprises the subject matter of any variation of any of example(s) 17-20, wherein, for each level of the one or more levels, the at least one CSI report comprises a class B report with K=1 or a class B report with K>1.

Example 22 comprises the subject matter of any variation of any of example(s) 17-20, wherein, for each level of the one or more levels, the at least one CSI report comprises a Class A report.

Example 23 comprises the subject matter of any variation of any of example(s) 17-20, wherein, for each level of the one or more levels, the at least one CSI report comprises a depth indicator that indicates that level.

Example 24 comprises the subject matter of any variation of any of example(s) 17-20, wherein, for each level of the one or more levels, the at least one CSI report indicates one or more eigenvectors associated with a first polarization for the best beam for that level and a co-phase between the first polarization and a second polarization for the best beam for that level.

Example 25 is an apparatus configured to be employed within a User Equipment (UE), comprising: a memory; and one or more processors configured to: process a set of beamformed CSI (Channel State Information)-RS (Reference Symbols); calculate, based on the processed set of beamformed CSI-RS, one or more eigenvectors associated with a precoding matrix of a first polarization associated with the beamformed CSI-RS; determine, based on the processed set of CSI-RS, a co-phase between the first polarization and a distinct second polarization; and generate one or more CSI reports indicating the eigenvectors and the co-phase, wherein the memory is configured to store the eigenvectors and the co-phase.

Example 26 comprises the subject matter of any variation of any of example(s) 25, wherein the one or more eigenvectors are calculated for a first subband size of N1 RBs (Resource Blocks) and the co-phase is determined for a second subband size of N2 RBs, wherein N1 is distinct from N2, and wherein the one or more CSI reports indicate the eigenvectors based on the first subband size and indicate the co-phase based on the second subband size, and wherein the one or more processors are configured to determine N1 and N2 based on either higher layer signaling or predefined values.

Example 27 comprises the subject matter of any variation of any of example(s) 25, wherein the one or more CSI reports comprises a first CSI report that indicates the one or more eigenvectors with a reporting period of T1 subframes and a second CSI report that indicates the co-phase with a reporting period of T2 subframes, wherein T1 is distinct from T2, and wherein the one or more processors are configured to determine T1 and T2 based on either higher layer signaling or predefined values.

Example 28 comprises the subject matter of any variation of any of example(s) 25-27, wherein the one or more CSI reports indicate each eigenvector of the one or more eigenvectors via an associated amplitude and an associated phase.

Example 29 comprises the subject matter of any variation of any of example(s) 25-27, wherein the one or more processors are further configured to quantize the one or more eigenvectors based on a Givens rotation and wherein the one or more CSI reports indicate the one or more eigenvectors via a set of quantified angles based on either an even quantization or an uneven quantization.

Example 30 comprises the subject matter of any variation of any of example(s) 25-27, wherein the one or more processors are further configured to quantize the one or more eigenvectors based on a Householder transformation and wherein the one or more CSI reports indicate the one or more eigenvectors via a set of quantified angles based on either an even quantization or an uneven quantization.

Example 31 comprises the subject matter of any variation of any of example(s) 25-26, wherein the one or more CSI reports comprises a first CSI report that indicates the one or more eigenvectors with a reporting period of T1 subframes and a second CSI report that indicates the co-phase with a reporting period of T2 subframes, wherein T1 is distinct from T2, and wherein the one or more processors are configured to determine T1 and T2 based on either higher layer signaling or predefined values.

Example 32 is an apparatus configured to be employed within an Evolved NodeB (eNB), comprising: a memory; and one or more processors configured to: generate a set of beamformed CSI (Channel State Information)-RS (Reference Symbols); process one or more CSI reports that indicate one or more eigenvectors associated with a first polarization of the set of beamformed CSI-RS and a co-phase between the first polarization and a distinct second polarization; and calculate a precoding matrix based on the one or more eigenvectors and the co-phase, wherein the memory is configured to store the eigenvectors and the co-phase.

Example 33 comprises the subject matter of any variation of any of example(s) 32, wherein the one or more eigenvectors are calculated for a first subband size of N1 RBs (Resource Blocks) and the co-phase is determined for a second subband size of N2 RBs, wherein N1 is distinct from N2, and wherein the one or more CSI reports indicate the eigenvectors based on the first subband size and indicate the co-phase based on the second subband size, and wherein the one or more processors are configured to generate higher layer signaling that indicates N1 and N2.

Example 34 comprises the subject matter of any variation of any of example(s) 32, wherein the one or more CSI reports comprises a first CSI report that indicates the one or more eigenvectors with a reporting period of T1 subframes and a second CSI report that indicates the co-phase with a reporting period of T2 subframes, wherein T1 is distinct from T2, and wherein the one or more processors are configured to generate higher layer signaling that indicates T1 and T2.

Example 35 comprises the subject matter of any variation of any of example(s) 32-34, wherein the one or more CSI reports indicate each eigenvector of the one or more eigenvectors either via an associated set of quantified angles or via an associated amplitude and an associated phase.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within a User Equipment (UE), comprising:
   a memory; and
   one or more processors configured to:
      for each level of one or more levels:
         for each of one or more beams for that level, measure one or more CSI parameters for that beam based on cell common CSI (Channel State Information)-RS (Reference Symbols) of that beam;
         determine a best beam for that level based on the measured one or more CSI parameters of the one or more beams for that level; and
         generate at least one CSI report for that level indicating the best beam for that level;
      for each of one or more UE-specific beams, measure one or more CSI parameters for that UE-specific beam based on UE-specific CSI-RS of that UE-specific beam;
      determine a best UE-specific beam of the one or more UE-specific beams based on the measured one or more CSI parameters of the one or more UE-specific beams; and
      generate at least one UE-specific CSI report indicating the best UE-specific beam,
   wherein the memory is configured to store an associated cell common indicator for the best beam for each level of the one or more levels and to store an associated UE-specific indicator for the best UE-specific beam,
   wherein the one or more levels comprises two or more levels, and for each level other than a final level of the one or more levels, a pair of CSI-RS APs (Antenna Ports) for each beam of that level is associated with a distinct set of pairs of CSI-RS APs for a plurality of beams of a next level of the one or more levels, and
   wherein the one or more processors are configured to either:
   process higher layer signaling that indicates the association between the pair of CSI-RS APs for each beam and the distinct set of pairs of CSI-RS APs for the plurality of beams of the next level; or
   determine, based on predefined values, the association between the pair of CSI-RS APs for each beam and the distinct set of pairs of CSI-RS APs for the plurality of beams of the next level.

2. The apparatus of claim 1, wherein the one or more processors are further configured to process higher layer signaling that indicates a depth, N, wherein the one or more levels comprises N levels.

3. The apparatus of claim 1, wherein the one or more processors are further configured to process higher layer signaling that indicates a level index associated with CSI-RS resources for each level of the one or more levels.

4. The apparatus of claim 1, wherein the one or more processors are further configured to determine a level index associated with CSI-RS resources for each level of the one or more levels based on a predefined value.

5. The apparatus of claim 1, wherein, for each level of the one or more levels, the at least one CSI report comprises a class B report with K=1 or a class B report with K>1.

6. The apparatus of claim 1, wherein the CSI report comprises a PMI (Precoding Matrix Indicator) index when the CSI report comprises the class B report with K=1, and wherein the CSI report comprises a CRI (CSI-RS Resource Indicator) index when the CSI report comprises the class B report with K>1.

7. The apparatus of claim 1, wherein, for each level of the one or more levels, the measured one or more CSI parameters is a PMI (Precoding Matrix Indicator).

8. The apparatus of claim 7, wherein the Class A report is based at least in part on an oversampling rate of 1 or 2.

9. The apparatus of claim 1, wherein, for each level of the one or more levels, the at least one CSI report comprises a Class A report.

10. The apparatus of claim 1, wherein, for each level of the one or more levels, the at least one CSI report comprises a depth indicator that indicates that level.

11. The apparatus of claim 1, wherein, for each level of the one or more levels, the at least one CSI report indicates one or more eigenvectors associated with a first polarization for the best beam for that level and a co-phase between the first polarization and a second polarization for the best beam for that level.

12. An apparatus configured to be employed within an Evolved NodeB (eNB), comprising:
   a memory; and
   one or more processors configured to:
      determine a set of beams for a first level of one or more cell common levels;
      for each level of the one or more cell common levels:
         for each of one or more beams for that level, generate a set of cell common CSI (Channel State Information)-RS (Reference Symbols) for that beam;
         receive at least one CSI report for that level indicating a best beam for that level; and
         determine a set of beams for a next level, wherein the next level is a UE (User Equipment)-specific level or a next level of the one or more cell common levels;
      for each of one or more UE-specific beams of the UE-specific level, generate a set of UE-specific CSI-RS of that UE-specific beam; and
      receive at least one UE-specific CSI report indicating a best UE-specific beam,
   wherein the memory is configured to store an associated cell common indicator for the best beam for each level of the one or more levels and to store an associated UE-specific indicator for the best UE-specific beam,
   wherein the one or more levels comprises two or more levels, and for each level other than a final level of the one or more levels, a pair of CSI-RS APs (Antenna Ports) for each beam of that level is associated with a distinct set of pairs of CSI-RS APs for a plurality of beams of a next level of the one or more levels, and
   wherein the one or more processors are configured to generate higher layer signaling that indicates the association between the pair of CSI-RS APs for each beam and the distinct set of pairs of CSI-RS APs for the plurality of beams of the next level.

13. The apparatus of claim 12, wherein the one or more processors are further configured to generate higher layer signaling that indicates a depth, N, wherein the one or more levels comprises N levels.

14. The apparatus of claim 12, wherein the one or more processors are further configured to generate higher layer signaling that indicates a level index associated with CSI-RS resources for each level of the one or more levels.

15. The apparatus of claim 12, wherein, for each level of the one or more levels, the at least one CSI report comprises a class B report with K=1 or a class B report with K>1.

16. The apparatus of claim 12, wherein, for each level of the one or more levels, the at least one CSI report comprises a Class A report.

17. The apparatus of claim 12, wherein, for each level of the one or more levels, the at least one CSI report comprises a depth indicator that indicates that level.

18. The apparatus of claim 12, wherein, for each level of the one or more levels, the at least one CSI report indicates one or more eigenvectors associated with a first polarization for the best beam for that level and a co-phase between the first polarization and a second polarization for the best beam for that level.

19. An apparatus configured to be employed within a User Equipment (UE), comprising:
a memory; and
one or more processors configured to:
process a set of beamformed CSI (Channel State Information)-RS (Reference Symbols);
calculate, based on the processed set of beamformed CSI-RS, one or more eigenvectors associated with a precoding matrix of a first polarization associated with the beamformed CSI-RS;
determine, based on the processed set of CSI-RS, a co-phase between the first polarization and a distinct second polarization; and
generate one or more CSI reports indicating the eigenvectors and the co-phase,
wherein the memory is configured to store the eigenvectors and the co-phase.

20. The apparatus of claim 19, wherein the one or more eigenvectors are calculated for a first subband size of $N_1$ RBs (Resource Blocks) and the co-phase is determined for a second subband size of $N_2$ RBs, wherein $N_1$ is distinct from $N_2$, and wherein the one or more CSI reports indicate the eigenvectors based on the first subband size and indicate the co-phase based on the second subband size, and wherein the one or more processors are configured to determine $N_1$ and $N_2$ based on either higher layer signaling or predefined values.

21. The apparatus of claim 19, wherein the one or more CSI reports comprises a first CSI report that indicates the one or more eigenvectors with a reporting period of $T_1$ subframes and a second CSI report that indicates the co-phase with a reporting period of $T_2$ subframes, wherein $T_1$ is distinct from $T_2$, and wherein the one or more processors are configured to determine $T_1$ and $T_2$ based on either higher layer signaling or predefined values.

22. The apparatus of claim 19, wherein the one or more CSI reports indicate each eigenvector of the one or more eigenvectors via an associated amplitude and an associated phase.

23. The apparatus of claim 19, wherein the one or more processors are further configured to quantize the one or more eigenvectors based on a Givens rotation and wherein the one or more CSI reports indicate the one or more eigenvectors via a set of quantified angles based on either an even quantization or an uneven quantization.

24. The apparatus of claim 19, wherein the one or more processors are further configured to quantize the one or more eigenvectors based on a Householder transformation and wherein the one or more CSI reports indicate the one or more eigenvectors via a set of quantified angles based on either an even quantization or an uneven quantization.

25. An apparatus configured to be employed within an Evolved NodeB (eNB), comprising:
a memory; and
one or more processors configured to:
generate a set of beamformed CSI (Channel State Information)-RS (Reference Symbols);
process one or more CSI reports that indicate one or more eigenvectors associated with a first polarization of the set of beamformed CSI-RS and a co-phase between the first polarization and a distinct second polarization; and
calculate a precoding matrix based on the one or more eigenvectors and the co-phase,
wherein the memory is configured to store the eigenvectors and the co-phase.

26. The apparatus of claim 25, wherein the one or more eigenvectors are calculated for a first subband size of $N_1$ RBs (Resource Blocks) and the co-phase is determined for a second subband size of $N_2$ RBs, wherein $N_1$ is distinct from $N_2$, and wherein the one or more CSI reports indicate the eigenvectors based on the first subband size and indicate the co-phase based on the second subband size, and wherein the one or more processors are configured to generate higher layer signaling that indicates $N_1$ and $N_2$.

27. The apparatus of claim 25, wherein the one or more CSI reports comprises a first CSI report that indicates the one or more eigenvectors with a reporting period of $T_1$ subframes and a second CSI report that indicates the co-phase with a reporting period of $T_2$ subframes, wherein $T_1$ is distinct from $T_2$, and wherein the one or more processors are configured to generate higher layer signaling that indicates $T_1$ and $T_2$.

28. The apparatus of claim 25, wherein the one or more CSI reports indicate each eigenvector of the one or more eigenvectors either via an associated set of quantified angles or via an associated amplitude and an associated phase.

* * * * *